US012719793B2

(12) United States Patent
Przygienda et al.

(10) Patent No.: US 12,719,793 B2
(45) Date of Patent: Aug. 25, 2026

(54) SEAMLESS SUPPORT AND NODE-BY-NODE MIGRATION FOR MULTIPLE DISTRIBUTED FLOOD REDUCTION ALGORITHMS IN THE SAME NETWORK

(71) Applicant: Juniper Networks, Inc., Sunnyvale, CA (US)

(72) Inventors: Antoni B. Przygienda, Comano (CH); Shraddha Hegde, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 39 days.

(21) Appl. No.: 19/064,821

(22) Filed: Feb. 27, 2025

(65) Prior Publication Data

US 2025/0293978 A1 Sep. 18, 2025

(30) Foreign Application Priority Data

Mar. 15, 2024 (IN) ............................ 202441019003

(51) Int. Cl.
*H04L 45/12* (2022.01)
*H04L 41/0604* (2022.01)
(Continued)

(52) U.S. Cl.
CPC .......... *H04L 47/11* (2013.01); *H04L 41/0622* (2013.01); *H04L 47/125* (2013.01)

(58) Field of Classification Search
None
See application file for complete search history.

(56) References Cited

U.S. PATENT DOCUMENTS 10,917,352 B1 * 2/2021 Hanes ..................... H04L 69/16
11,057,235 B1 * 7/2021 Varahabhotla ........ H04L 12/185
(Continued)

FOREIGN PATENT DOCUMENTS

CN 105763446 A 7/2016

OTHER PUBLICATIONS

Liu Jing and Sun Shuhe, “Ring automatic protection technology in Carrier Ethernet,” 2010 The 2nd International Conference on Computer and Automation Engineering (ICCAE), Singapore, 2010, pp. 491-495, doi: 10.1109/ICCAE.2010.5451908. (Year: 2010).*
(Continued)

*Primary Examiner* — Christopher B Robinson
(74) *Attorney, Agent, or Firm* — Harrity & Harrity, LLP

(57) ABSTRACT

A first network device of a first tier of a network may receive a modified link state protocol (LSP) data unit, and may determine, based on the modified LSP data unit, whether an origin of the modified LSP data unit is executing the same algorithm as the first network device. The first network device may calculate a shortest-path spanning tree (SPT), and may set metrics to one for links associated with the first network device and the plurality of other network devices based on determining that the origin of the modified LSP data unit is executing a different algorithm than the first network device. The first network device may truncate the SPT to determine a flooding group, may select a member of the flooding group to flood the modified LSP data unit, and may cause the member to provide the modified LSP data unit to a second tier network device.

20 Claims, 10 Drawing Sheets

(51) Int. Cl.

| | |
|---|---|
| ***H04L 45/00*** | (2022.01) |
| ***H04L 45/18*** | (2022.01) |
| ***H04L 47/11*** | (2022.01) |
| ***H04L 47/125*** | (2022.01) |

(56) References Cited

U.S. PATENT DOCUMENTS

| | | | | |
|---|---|---|---|---|
| 2006/0245429 | A1* | 11/2006 | Luong | H04L 45/03 370/394 |
| 2015/0043383 | A1* | 2/2015 | Farkas | H04L 45/22 370/254 |
| 2019/0097928 | A1* | 3/2019 | Chunduri | H04L 12/4633 |
| 2022/0006726 | A1* | 1/2022 | Michael | H04L 41/0806 |
| 2022/0103463 | A1* | 3/2022 | Margaria | H04L 45/02 |
| 2022/0385560 | A1* | 12/2022 | Dutta | H04L 45/26 |
| 2023/0362089 | A1* | 11/2023 | Wang | H04L 45/02 |

OTHER PUBLICATIONS

Ginsberg et al., "IS-IS Extensions for Advertising Router Information," Internet Engineering Task Force (IETF), Request for Comments: 7981, Oct. 2016, 10 Pages.

Baccelli et al., "OSPF Multipoint Relay (MPR) Extension for Ad Hoc Networks," Network Working Group, Request for Comments: 5449, Feb. 2009, 31 Pages.

Ogier et al., "Mobile Ad Hoc Network (MANET) Extension of OSPF Using Connected Dominating Set (CDS) Flooding," Network Working Group, Request for Comments: 5614, Aug. 2009, 71 Pages.

Li et al., "IS-IS Cryptographic Authentication," Network Working Group, Request for Comments: 5304, Oct. 2008, 11 Pages.

Cotton et al., "Guidelines for Writing an IANA Considerations Section in RFCs," Internet Engineering Task Force (IETF), Request for Comments: 8126, Jun. 2017, 47 Pages.

Akamai, R.W., et al., "IS-IS Optimal Distributed Flooding for Dense Topologies Draft-ietf-lsr-distoptflood-03; Draft-ietf-lsr-distoptflood-03.Txt," Juniper Networks, Internet-draft: Network Working Group, Internet Engineering Task Force, IETF, No. 3, Feb. 9, 2024, XP015164910, Retrieved from the Internet: URL:https://tools.ietf.org/html/draft-ietf-lsr-distoptflood-03 [retrieved on Feb. 9, 2024], 13 pages.

Extended European Search Report for European Application No. EP25163487.9 dated Jul. 2, 2025, 11 pages.

White, R., et al., "IS-IS Optimal Distributed Flooding for Dense Topologies; Draft-white-distoptflood-04.Txt", Draft-white-distoptflood-04.Txt; Internet-draft: Network Working Group, Internet Engineering Task Force, Ietf; Standardworkingdraft, Internet S , No. 4 Jul. 27, 2020, XP015141182, Retrieved from the Internet: URL:https://tools.ietf.org/html/draft-whit e-distoptflood-04 [retrieved on Jul. 27, 2020], 12 pages.

* cited by examiner

200

SEAMLESS SUPPORT AND NODE-BY-NODE MIGRATION FOR MULTIPLE DISTRIBUTED FLOOD REDUCTION ALGORITHMS IN THE SAME NETWORK

CROSS-REFERENCE TO RELATED APPLICATION

This Patent Applications claims priority to India Provisional Patent Application No. 202441019003, filed on Mar. 15, 2024, and entitled "SEAMLESS SUPPORT AND NODE-BY-NODE MIGRATION FOR MULTIPLE DISTRIBUTED FLOOD REDUCTION ALGORITHMS IN A SAME NETWORK." The disclosure of the prior Applications is considered part of and is incorporated by reference into this Patent Applications.

BACKGROUND

In dense topologies (e.g., data center fabrics with a relatively high degree of connectivity), interior gateway protocol (IGP) flooding mechanisms designed originally for rather sparse topologies can overflood a network. The overflooding may occur due to generation of many identical copies of the same information arriving at a given network device (node) from other network devices (nodes).

SUMMARY

Some implementations described herein relate to a method. The method may include receiving, by a first network device in a first tier of a network, a modified link state protocol (LSP) data unit that is also provided to a plurality of other network devices in the first tier, and determining, based on the modified LSP data unit, whether an origin of the modified LSP data unit is executing an algorithm and a version of the algorithm that is the same as an algorithm and a version being executed by the first network device. The method may include calculating a shortest-path spanning tree (SPT), and setting metrics to one for links associated with the first network device and the plurality of other network devices based on determining that the origin of the modified LSP data unit is executing an algorithm and a version of the algorithm that is not the same as an algorithm and a version being executed by the first network device. The method may include truncating the SPT to two hops to determine a flooding group that includes the first network device and the plurality of other network devices, and selecting a member of the flooding group to flood the modified LSP data unit. The method may include causing the member to provide the modified LSP data unit to a second network device in a second tier of the network.

Some implementations described herein relate to a first network device that includes one or more memories and one or more processors. The one or more processors may be configured to receive a modified link state protocol (LSP) data unit that is also provided to a plurality of other network devices in a first tier of a network that includes the first network device, and determine, based on the modified LSP data unit, whether an origin of the modified LSP data unit is executing an algorithm and a version of the algorithm that is the same as an algorithm and a version being executed by the first network device. The one or more processors may be configured to calculate a shortest-path spanning tree (SPT), and set metrics to one for links associated with the first network device and the plurality of other network devices based on determining that the origin of the modified LSP data unit is executing an algorithm and a version of the algorithm that is not the same as an algorithm and a version being executed by the first network device. The one or more processors may be configured to truncate the SPT to two hops to determine a flooding group that includes the first network device and the plurality of other network devices, and select a member of the flooding group to flood the modified LSP data unit. The one or more processors may be configured to cause the member to provide the modified LSP data unit to a second network device in a second tier of the network, and cause other members of the flooding group to not provide the modified LSP data unit to the second network device.

Some implementations described herein relate to a non-transitory computer-readable medium that stores a set of instructions. The set of instructions, when executed by one or more processors of a first network device in a first tier of a network, may cause the first network device to utilize an intermediate-system-to-intermediate-system cryptographic authentication to receive a modified link state protocol (LSP) data unit that is also provided to a plurality of other network devices in the first tier, and determine, based on the modified LSP data unit, whether an origin of the modified LSP data unit is executing an algorithm and a version of the algorithm that is the same as an algorithm and a version being executed by the first network device. The set of instructions, when executed by one or more processors of the first network device, may cause the first network device to calculate a shortest-path spanning tree (SPT), and set metrics to one for links associated with the first network device and the plurality of other network devices based on determining that the origin of the modified LSP data unit is executing an algorithm and a version of the algorithm that is not the same as an algorithm and a version being executed by the first network device. The set of instructions, when executed by one or more processors of the first network device, may cause the first network device to truncate the SPT to two hops to determine a flooding group that includes the first network device and the plurality of other network devices, and select a member of the flooding group to flood the modified LSP data unit. The set of instructions, when executed by one or more processors of the first network device, may cause the first network device to cause the member to provide the modified LSP data unit to a second network device in a second tier of the network.

DETAILED DESCRIPTION

Figure 1A:
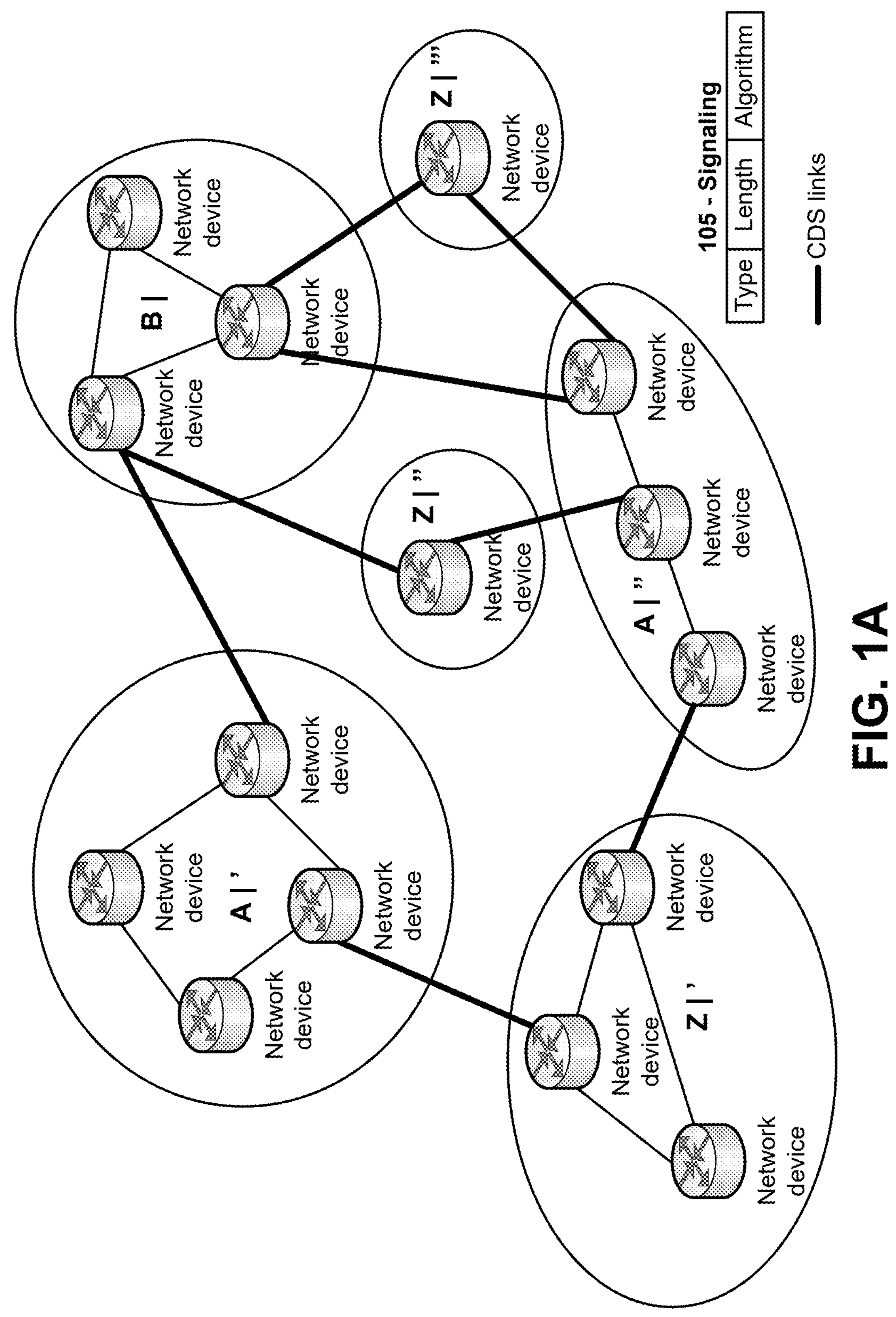
FIGS. 1A-1F are diagrams of an example associated with providing seamless support and node-by-node migration for multiple distributed flood reduction algorithms in the same network.

The following detailed description of example implementations refers to the accompanying drawings. The same reference numbers in different drawings may identify the same or similar elements.

Overflooding results in slower convergence times and higher resource utilization to process and discard superfluous copies of the same information. Distributed algorithms that restrict the amount of flooding performed can be constructed, as long as the algorithms result in a flooding subgraph connecting all network devices in a network in terms of flooding. Any such algorithm with some additional rules may be defined as a distributed flooding pruner (or a pruner for short), where the additional rules govern the behavior when encountering adjacencies with network devices deploying another type of pruner to allow for safe pruner mixing. The terms “algorithm” and “pruner” may be used interchangeably in this application. Current IGP flooding techniques consume computing resources (e.g., processing resources, memory resources, communication resources, and/or the like), networking resources, and/or the like, associated with identifying identical copies of the same information during an overflooding situation, providing the identical copies of the same information to a network device, discarding the identical copies of the same information by the network device, and/or the like.

Some implementations described herein relate to providing seamless support and node-by-node migration for multiple distributed flood reduction algorithms in the same network. For example, a first network device of a first tier of a network may receive a modified link state protocol (LSP) data unit that is also provided to a plurality of other network devices in the first tier, and may determine, based on the modified LSP data unit, whether an origin of the modified LSP data unit is executing an algorithm and a version of the algorithm that is the same as an algorithm and a version being executed by the first network device. The first network device may calculate a shortest-path spanning tree (SPT), and may set metrics to one for links associated with the first network device and the plurality of other network devices based on determining that the origin of the modified LSP data unit is executing an algorithm and a version of the algorithm that is not the same as an algorithm and a version being executed by the first network device. The first network device may truncate the SPT to two hops to determine a flooding group that includes the first network device and the plurality of other network devices, and may select a member of the flooding group to flood the modified LSP data unit. The first network device may cause the member to provide the modified LSP data unit to a second network device in a second tier of the network.

In this way, seamless support and node-by-node migration for multiple distributed flood reduction algorithms in the same network is provided. For example, a mix of network devices, not deploying any reduction in full flooding and multiple pruners, may be deployed at the same time, if necessary, while ensuring correct flood coverage for an entire network. The implementations may enable network-device-by-network-device migration (e.g., at the same time) from one pruner to another pruner. Assuming that algorithms are behaving correctly, flood coverage may be contained to a single network device changing an algorithm and convergence of an algorithm on introduction or removal of a network device executing such algorithm. The implementations may reduce extraneous copies of the same information and may load-balance flooding across different possible paths in the network to prevent creation of a flooding hotspot. The implementations may not require centralized network devices, may not require manual configuration, may allow network-device-by-network-device migration to any new algorithm, and may allow different algorithms to coexist in the same network. Thus, the implementations conserve computing resources, networking resources, and/or the like that would otherwise have been consumed by identifying identical copies of the same information during an overflooding situation, providing the identical copies of the same information to a network device, discarding the identical copies of the same information by the network device.

FIGS. 1A-1F are diagrams of an example 100 associated with providing seamless support and node-by-node migration for multiple distributed flood reduction algorithms in the same network. With reference to FIGS. 1A-1F, a network may include network devices (e.g., also referred to herein as “nodes”). The network devices may include distributed algorithms that restrict the amount of flooding performed. The algorithms may generate a flooding subgraph connecting all nodes in a network in terms of flooding. Such algorithms can reduce resource utilization significantly, while improving convergence performance. Any such algorithm, with some additional rules, may be defined as a distributed flooding pruner (or a “pruner” for short), where the additional rules govern the behavior when encountering adjacencies with nodes deploying another type of pruner, to allow for safe pruner mixing and seamless migration.

A pruner may be an algorithm that includes all adjacencies and may be referred to as a zero-pruner. In such cases, the algorithm floods on all links in the network. Implementations described herein may enable a single pruner to execute on a specific network device and may enable changing a pruner at any time on any subset of network devices in the network while limiting an impact to the network device and convergence of network devices in a component. A component may include a subset of network devices executing a pruner, where each of the network devices can be connected to all other network devices by a path traversing adjacencies with the same pruner on both sides. The network may include multiple components which are not connected but execute the same pruner. A component for a pruner A may be denoted as A|, and two disjoint components executing pruner A may be denoted as A|' and A|". A zero-pruner may generate components denoted as Z| and its primes.

A flooding pruner must choose within its component a subset of links to flood so that the component remains connected (e.g., has a path over such links connecting each network device in the component of the pruner). This may be referred to as a connected dominating set (CDS) and may be denoted for component A| as A|*. The connected dominating set A|* may be different for different information that is flooded. Within each component, the network devices may be free to execute any kind of algorithm as long as it is a pruner. Some implementations may be completely distributed without a need for a centralized network device. Computation and communication within each component may be completely independent of other components. Except for determining which pruner is executing on a network device, no configuration is necessary if the pruner algorithm does not need a configuration (e.g., is completely distributed). A network device may choose a different pruner or a zero-pruner at any time, and independently of other network devices. A network device may end up in another component or may become a zero-pruner. A flooding pruner, except for a zero-pruner, must advertise, in its node information, which pruner is currently operating on the network device. A flooding pruner is an algorithm that builds a connected dominating set over its component.

As shown in FIG. 1A, the example 100 may include a network with network devices (e.g., nodes) associated with three pruners. Two components may execute a pruner A (e.g., A|' and A|"), one component may execute a pruner B, and three components may execute a zero-pruner Z (e.g., Z|', Z|", and Z|'"). An overall graph of the network may be connected as shown. FIG. 1A also depicts why an overall connected dominating set can be more than a spanning tree of the network. A network device seeing a neighbor network device executing another algorithm may not decide based on local knowledge whether a link should be included in flooding but may do so based on an overall view of the network. Links that connect a CDS of a component may be indicated by the wider lines of FIG. 1A. Further details of the network, the network devices, the pruners, the algorithms, and the components are provided elsewhere herein.

As further shown in FIG. 1A, and by reference number 105, the network devices may utilize sub-type-length-value (sub-TLV) signaling with a format that includes a type field, a length field, and an algorithm field. The sub-TLV must be advertised by a network device that is actively executing any pruner (e.g., except a zero-pruner) and the absence of the sub-TLV may indicate that a network device is a zero-pruner. In some implementations, the length field of the sub-TLV may include a value of two (2), and the algorithm field may include a numeric identifier that identifies the algorithm used to calculate a CDS (e.g., a flooding topology) of a component from the IGP flooding pruner registry. In some implementations, the algorithm may include a load-balancing algorithm, a mobile ad-hoc network (MANET)-based load-balancing algorithm, and/or the like.

Figure 1B:
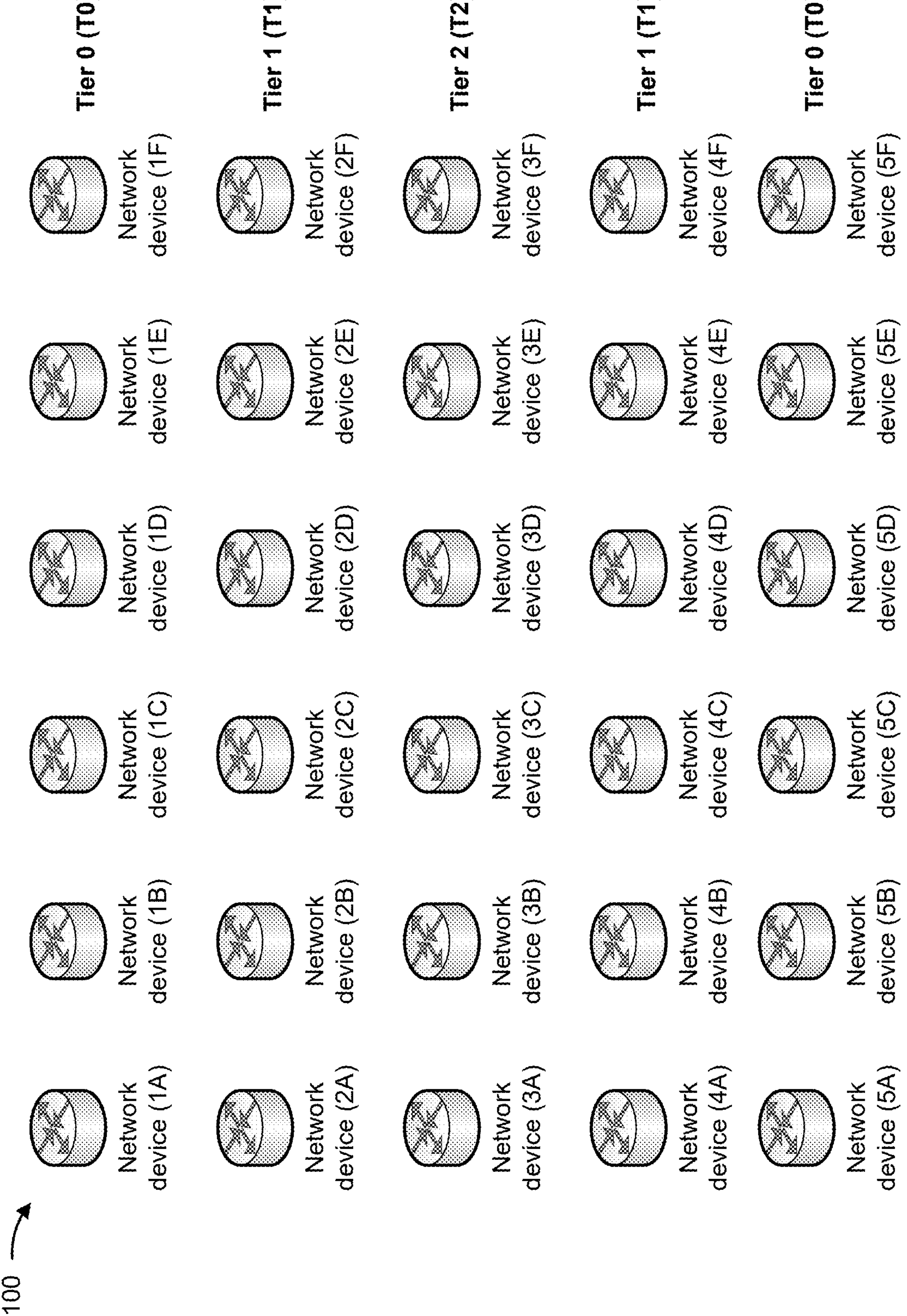

FIG. 1B depicts an example of a spine and leaf fabric network (e.g., with the links omitted for clarity) that includes network devices 1A through 5F. FIG. 1B does not include connections between network devices, for clarity purposes. Each network device in a given tier may be connected to every network device in a tier above each network device, in a butterfly network fashion. For example, network device 5A may connect to network devices 4A, 4B, 4C, 4D, 4E, and 4F; network device 5B may connect to network devices 4A, 4B, 4C, 4D, 4E, and 4F; network device 4A may connect to network devices 3A, 3B, 3C, 3D, 3E, 3F, 5A, 5B, 5C, 5D, 5E, and 5F; network device 4B may connect to network devices 3A, 3B, 3C, 3D, 3E, 3F, 5A, 5B, 5C, 5D, 5E, and 5F; and/or the like. The tiers of the fabric are marked for easier reference, with tier 2 (T2) being a top of the fabric and tier 0 (T0) representing leaves.

Figure 1C:
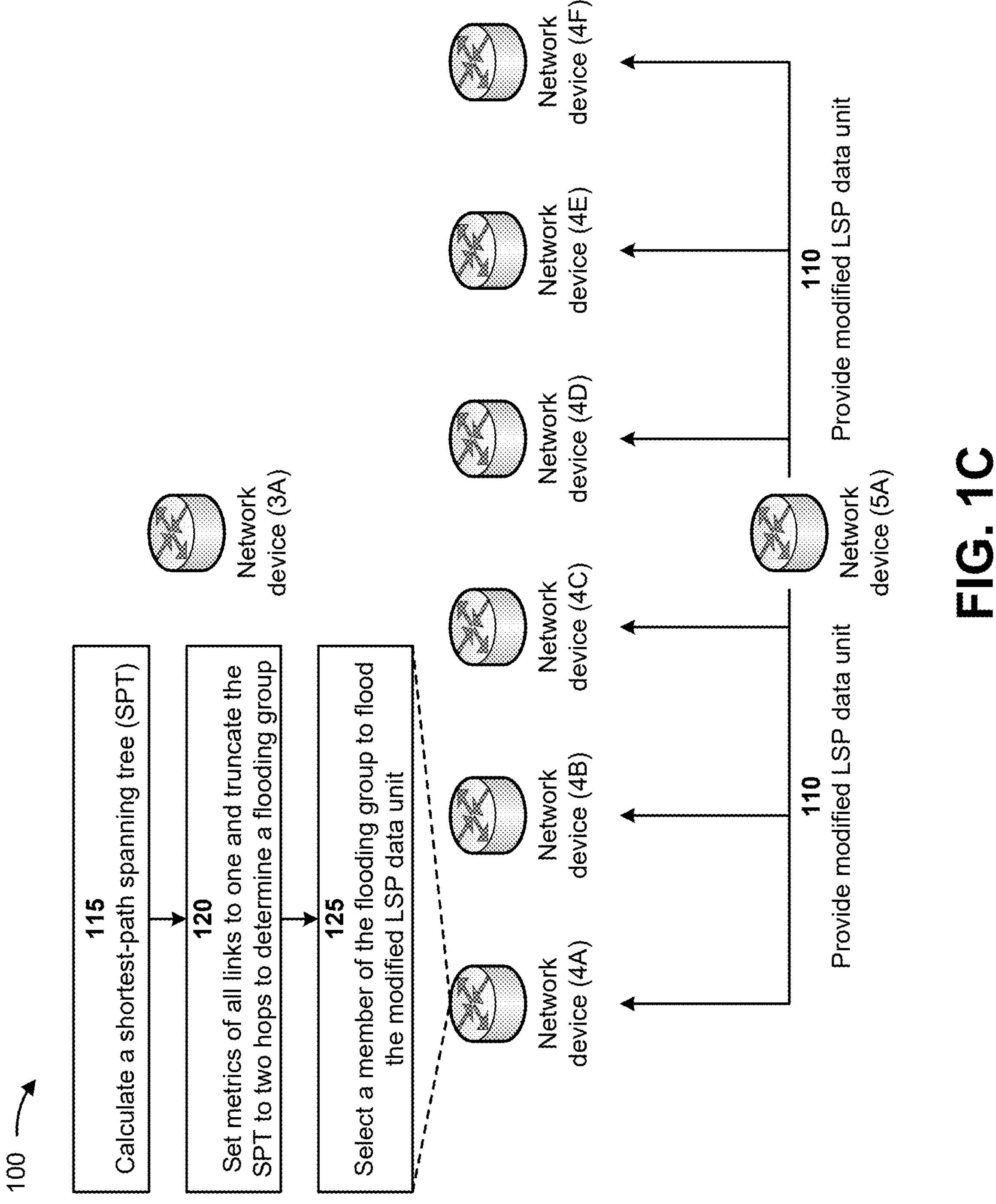

FIGS. 1C-1F depict an example of modifications to an intermediate-system-to-intermediate-system (IS-IS) flooding process to reduce a full topology to a dominating connected set of links used for flooding, and to balance remaining flooding across all links in the topology to prevent hotspots. As shown in FIG. 1C, and by reference number 110, the network device 5A may provide a modified LSP data unit to the network devices 4A through 4F. For example, the network device 5A may be a transmitting neighbor of the network devices 4A through 4F, and may generate the modified LSP data unit. Since the network device 5A is the transmitting neighbor of the network devices 4A through 4F, the network device 5A may flood the modified LSP data unit to the network devices 4A through 4F. Each of the network devices 4A-4F may, in turn, flood the modified LSP data unit to, for example, the network device 3A. Thus, the network device 3A may receive six copies of the modified LSP data unit, while only one copy of the modified LSP data unit is necessary for the intermediate systems shown in FIG. 1C to converge on the same view of the topology. Implementations described herein may prevent the network device 3A from receiving the duplicate copies of the modified LSP data unit.

As further shown in FIG. 1C, and by reference number 115, the network device 4A may calculate an SPT. For example, the network device 4A may identify a group of network devices that will flood to the same set of neighbors as a local IS. In some implementations, the network device 4A may determine that network devices 4A-4F (e.g., a flooding group) will all flood identical copies of the modified LSP data unit to the network device 3A. In order to determine a flooding group, the network device 4A may calculate an SPT from the point of view of the transmitting neighbor (e.g., the network device 5A).

As further shown in FIG. 1C, and by reference number 120, the network device 4A may set metrics of all links to one (1) and may truncate the SPT to two hops to determine a flooding group. For example, by setting the metrics of all links to one and truncating the SPT to two hops, the network device 4A may identify a group of neighbor network devices toward which the network device 4A will flood the modified LSP data unit, and may identify a group of network devices (e.g., a flooding group and not necessarily neighbor network devices) that will also flood the modified LSP data unit to the same group of neighbor network devices. If every network device in the flooding group (e.g., network devices 4A-4F) performs this same calculation, every network device will identify the same flooding group. For example, the network device 4A may determine that the group of neighbor network devices includes network devices 3A-3F, and may determine that the flooding groups includes network devices 4A-4F based on setting the metrics of all links to one and truncating the SPT to two hops.

As further shown in FIG. 1C, and by reference number 125, the network device 4A may select a member of the flooding group to flood the modified LSP data unit. For example, once the flooding group is determined, each member of the flooding group (e.g., each of the network devices 4A-4F) may independently select a member of the flooding group to flood the received information (e.g., the modified LSP data unit). A common hash function may be utilized across a set of shared variables (e.g., a common link state database) so that each member of the flooding group selects the same member of the flooding group to flood the modified LSP data unit.

Figure 1D:
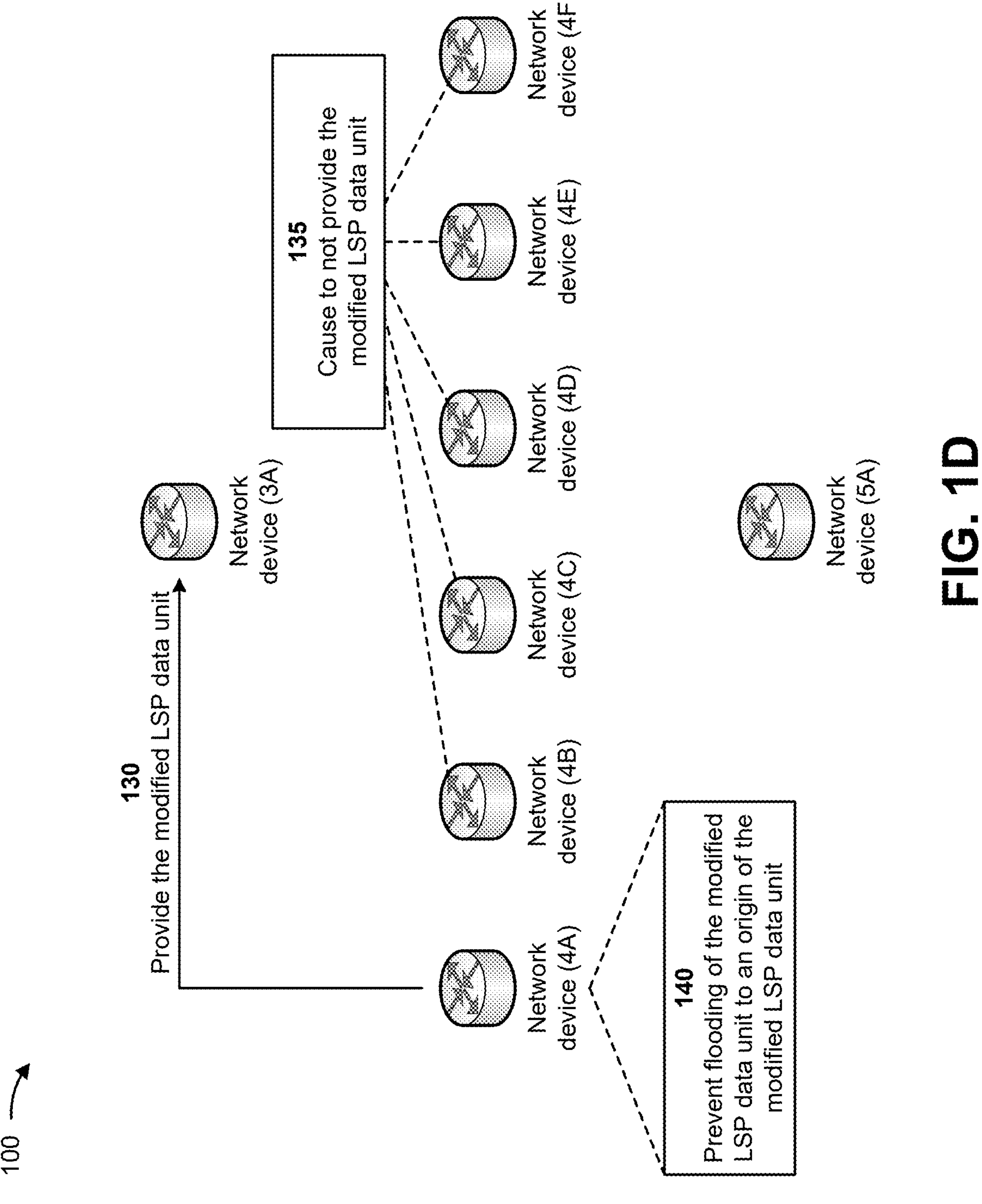

As shown in FIG. 1D, and by reference number 130, the network device 4A may provide the modified LSP data unit to the network device 3A. For example, when the network device 4A selects the network device 4A as the member of the flooding group to flood the modified LSP data unit, the network device 4A may provide the modified LSP data unit to the network device 3A. In some implementations, one of the network devices 4B-4F may be selected as the member of the flooding group to flood the modified LSP data unit. In such implementations, the one of the network devices 4B-4F selected as the member may provide the modified LSP data unit to the network device 3A.

As further shown in FIG. 1D, and by reference number 135, the network devices 4B-4F may not provide the modified LSP data unit to the network device 3A. For example, when the network device 4A selects the network device 4A as the member of the flooding group to flood the modified LSP data unit, the remaining members of the flooding group (e.g., the network devices 4B-4F) may not provide the modified LSP data unit to the network device 3A. In some implementations, one of the network devices 4B-4F may be selected as the member of the flooding group to flood the modified LSP data unit. In such implementations, the network device 4A and the network devices 4B-4F, other than the selected one of the network devices 4B-4F, may not provide the modified LSP data unit to the network device 3A. In this way, only a single copy of the modified LSP data unit is provided to the network device 3A. In some implementations, more than a single copy of the modified LSP data unit may be provided for redundancy purposes.

As further shown in FIG. 1D, and by reference number 140, the network device 4A may prevent flooding of the modified LSP data unit to an origin of the modified LSP data unit. For example, the network device 4A may implement a rule that prevents flooding of the modified LSP data unit along a shortest path toward the origin of the modified LSP data unit (e.g., the network device 5A). The rule may be based on the principle that any network device between the origin of the modified LSP data unit and a network device local to the origin should receive the modified LSP data unit from some other network device that is closer to the origin of the modified LSP data unit. Furthermore, if the network devices in the flooding group are pruned, the receiving network device (e.g., network device 3A) may be at a tail end of a flooding chain, and no further flooding will be necessary.

Figure 1E:
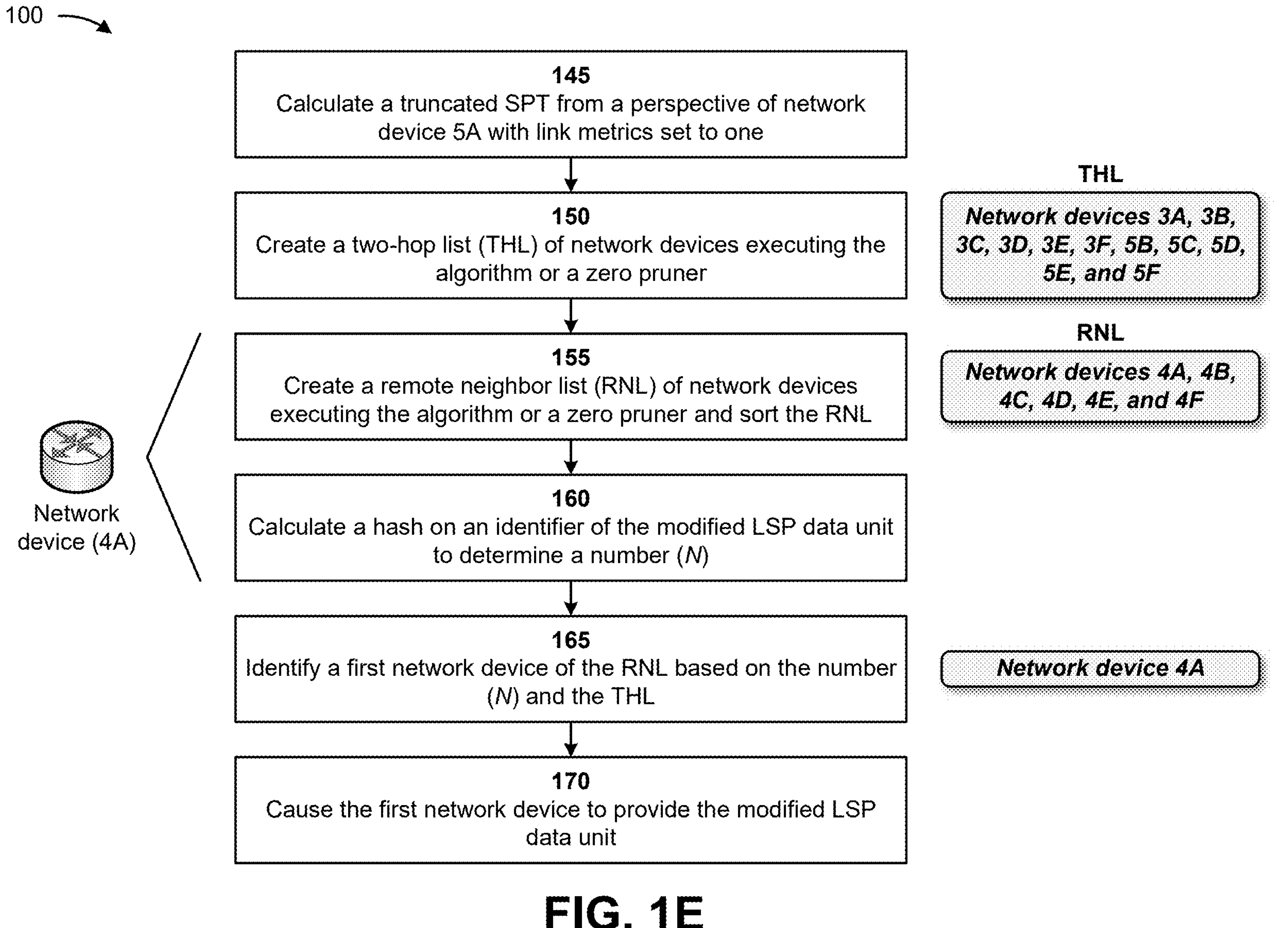

As shown in FIG. 1E, and by reference number 145, the network device 4A may calculate a truncated SPT from a perspective of the network device 5A with link metrics set to one. For example, the network device 4A may identify group of network devices that will flood to the same set of neighbors as a local IS. In some implementations, the network device 4A may determine that network devices 4A-4F (e.g., a flooding group) will all flood identical copies of the modified LSP data unit to the network device 3A. In order to determine a flooding group, the network device 4A may calculate an SPT from the point of view of the transmitting neighbor (e.g., the network device 5A). The network device 4A may set metrics of all links to one, and may truncate the SPT to two hops to determine a flooding group.

As further shown in FIG. 1E, and by reference number 150, the network device 4A may create a two-hop list (THL) of network devices executing the algorithm or a zero pruner. For example, the network device 4A may create the THL identifying network devices executing the algorithm or the zero-pruner based on calculating the truncated SPT from the perspective of the network device 5A with the link metrics set to one. For each network device that is two hops away (e.g., has a metric of two in the truncated SPT) from the transmitting network device (e.g., the network device 4A): if the network device is the originator of the modified LSP data unit, the network device may be skipped (e.g., not added to the THL); if the network device is a neighbor of the originator of the modified LSP data unit, the network device may be skipped (e.g., not added to the THL); if the network device is on a shortest path from the transmitting network device toward the originator of the modified LSP data unit, the network device may be skipped (e.g., not added to the THL); and if the network device is not on the shortest path from the transmitting network device toward the originator of the modified LSP, the network device may be added to the THL. As further shown in FIG. 1E, in one example, the THL may include the network devices 3A, 3B, 3C, 3D, 3E, 3F, 5B, 5C, 5D, 5E, and 5F, based on such an analysis.

As further shown in FIG. 1E, and by reference number 155, the network device 4A may create a remote neighbor list (RNL) of network devices executing the algorithm or a zero pruner and may sort the RNL. For example, the network device 4A may create the RNL identifying network devices executing the algorithm or a zero pruner based on adding, to the RNL, each network device that is one hop away from the transmitting network device. As further shown in FIG. 1E, in one example, the RNL may include the network devices 4A, 4B, 4C, 4D, 4E, and 4F. In some implementations, the network device 4A may sort the RNL based on system identifiers, and from the least value to the greatest.

As further shown in FIG. 1E, and by reference number 160, the network device 4A may calculate a hash on an identifier of the modified LSP data unit to determine a number (N). For example, the network device 4A may calculate a preliminary number (H) by adding each byte in the identifier of the modified LSP data unit. If RNum is a number of network devices in the RNL, the network device 4A may set the number (N) to an H MOD of RNum (e.g., N=H MOD RNum). With such a calculation, the number (N) may be less than a number of members of the RNL.

As further shown in FIG. 1E, and by reference number 165, the network device 4A may identify a first network device of the RNL based on the number (N) and the THL. For example, starting with the Nth member of RNL, where N is an index of the members in the RNL, and with the index starting from zero (e.g., wherein index zero may assigned to a network device with a lowest system identifier): if the THL is empty, the network device 4A may bypass this step; if a member of the RNL is a local calculating network device, such a network device may reflood the modified LSP data unit; the network device 4A may remove all members of the THL connected to (e.g., adjacent to) this member of the RNL; and the network device 4A may move to the next member of the RNL, wrapping to the beginning of the RNL if necessary. In this way, the network device 4A may identify the first network device of the RNL.

As further shown in FIG. 1E, and by reference number 170, the network device 4A may cause the first network device of the RNL to provide the modified LSP data unit. For example, the network device 4A may cause the identified first network device of the RNL to provide the modified LSP data unit to the network device 3A. In some implementations, the network device 4A may be the first member of the RNL, and may provide the modified LSP data unit to the network device 3A. In some implementations, a network device may choose, independently of other network devices, to provide a configurable parameter to allow for more than one network device in the RNL to reflood the modified LSP data unit (e.g., a network device may reflood even if the network device is only the member that would be chosen from the RNL if a double coverage of THL is required).

Figure 1F:
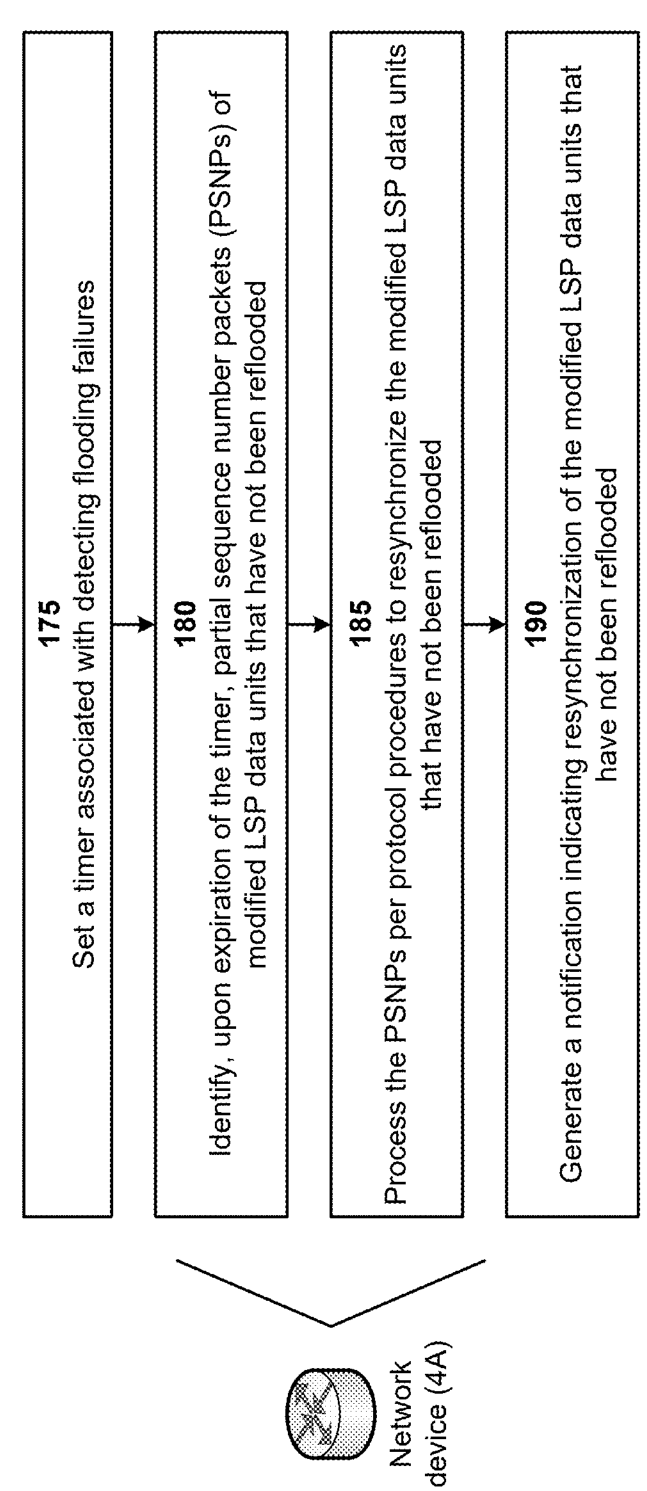

As shown in FIG. 1F, and by reference number 175, the network device 4A may set a timer associated with detecting flooding failures. For example, in a transitory state of network devices having potentially different views of topologies, the flooding may either overflood or not flood enough. It is possible that during initial convergence, or in some failure modes, the flooding may be incomplete. Specifically, if a reflooding network device fails, or is somehow disconnected from all links across which reflooding should occur, a modified LSP data unit may only be partially distributed through the topology. To speed up convergence under such partition failures (e.g., where periodic complete sequence number protocol data units (CSNPs) may converge the topology at a slower pace), a network device (e.g., the network device 4A) that does not reflood an LSP data unit (or a fragment) may set a configurable timer associated with detecting flooding failures. The timer may be significantly shorter than a CSNP interval.

As further shown in FIG. 1F, and by reference number 180, the network device 4A may identify, upon expiration of the timer, partial sequence number packets (PSNPs) of modified LSP data units that have not been reflooded. For example, when the timer expires, the network device 4A may send partial sequence number packets (PSNPs) of all LSP data units that have not been reflooded to all neighbor network devices unless an up-to-date PSNP or CSNP has been already received from the neighbor network device.

As further shown in FIG. 1F, and by reference number 185, the network device 4A may process the PSNPs per protocol procedures to resynchronize the modified LSP data units that have not been reflooded. For example, per normal protocol procedures, the network device 4A may process any received PSNPs indicating that neighbor network devices still have older versions of modified LSP data units. By processing the PSNPs, the network device 4A may resynchronize the modified LSP data units that have not been reflooded. In this way, the network device 4A may synchronize the databases that are out of sync after expiration of the timer.

As further shown in FIG. 1F, and by reference number 190, the network device 4A may generate a notification indicating resynchronization of the modified LSP data units that have not been reflooded. For example, if the resynchronizations are greater than a configurable threshold (e.g., a quantity of PSNPs that are sent to the neighbor network devices and are answered with requests), the network device 4A may generate the notification indicating resynchronization of the modified LSP data units that have not been reflooded. The network device 4A may provide the notification to a network operator so that the network operator is aware of the failed reflooding.

In some implementations, a network device deploying the algorithm on point-to-point links may send CSNPs on such links. This may prevent possible slow synchronization of the IS-IS database across such links and may provide additional periodic consistency guarantees. In some implementations, the network devices may enable IS-IS cryptographic authentication, and may enable other security measures in accordance with best common practices for the IS-IS protocol.

In this way, seamless support and node-by-node migration for multiple distributed flood reduction algorithms in the same network is provided. For example, a mix of network devices, not deploying any reduction in full flooding and multiple pruners, may be deployed at the same time, if necessary, while ensuring correct flood coverage for an entire network. The implementations may enable network-device-by-network-device migration (e.g., at the same time) from one pruner to another pruner. Assuming that algorithms are behaving correctly, flood coverage may be contained to a single network device changing an algorithm and convergence of the algorithm on introduction or removal of a network device executing such algorithm. The implementations may reduce extraneous copies of the same information and may load-balance flooding across different possible paths in the network to prevent creation of a flooding hotspot. Some implementations may not require centralized network devices, may not require manual configuration, may allow network-device-by-network-device migration to any new algorithm, and may allow different algorithms to coexist in the same network. Thus, the implementations conserve computing resources, networking resources, and/or the like that would otherwise have been consumed by identifying identical copies of the same information during an over-flooding situation, providing the identical copies of the same information to a network device, discarding the identical copies of the same information by the network device.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
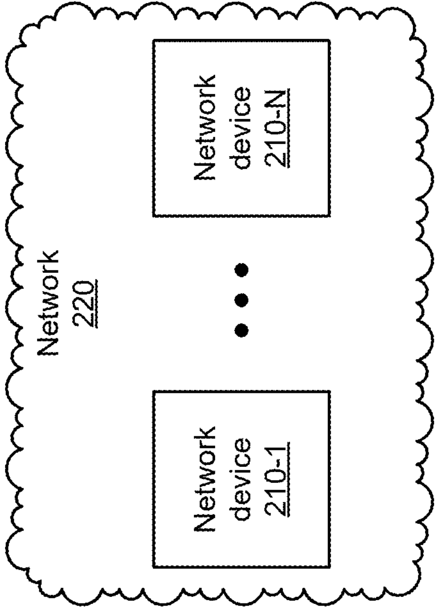
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 210 (shown as network device 210-1 through network device 210-N), and a network 220. Devices of the environment 200 may interconnect via wired connections, wireless connections, or a combination of wired and wireless connections.

The network device 210 includes one or more devices capable of receiving, processing, storing, routing, and/or providing traffic (e.g., a packet or other information or metadata) in a manner described herein. For example, the network device 210 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 210 may include a gateway, a switch, a firewall, a hub, a bridge, a reverse proxy, a server (e.g., a proxy server, a cloud server, or a data center server), a load balancer, and/or a similar device. In some implementations, the network device 210 may be a physical device implemented within a housing, such as a chassis. In some implementations, the network device 210 may be a virtual device implemented by one or more computer devices of a cloud computing environment or a data center. In some implementations, a group of network devices 210 may be a group of data center nodes that are used to route traffic flow through the network 220.

The network 220 includes one or more wired and/or wireless networks. For example, the network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN)), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
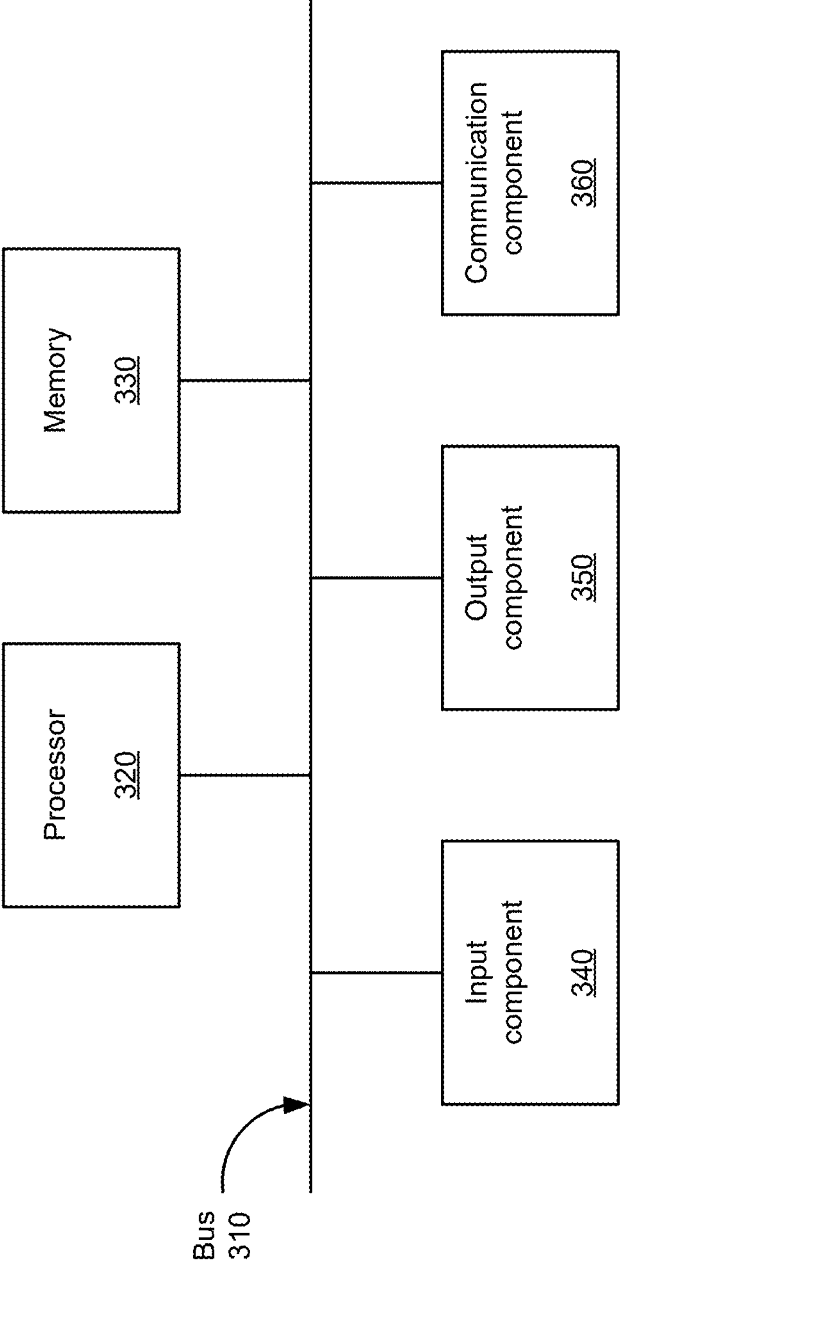
FIGS. 3 and 4 are diagrams of example components of one or more devices of FIG. 2.

FIG. 3 is a diagram of example components of one or more devices of FIG. 2. The example components may be included in a device 300, which may correspond to the network device 210. In some implementations, the network device 210 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), an accelerated processing unit (APU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
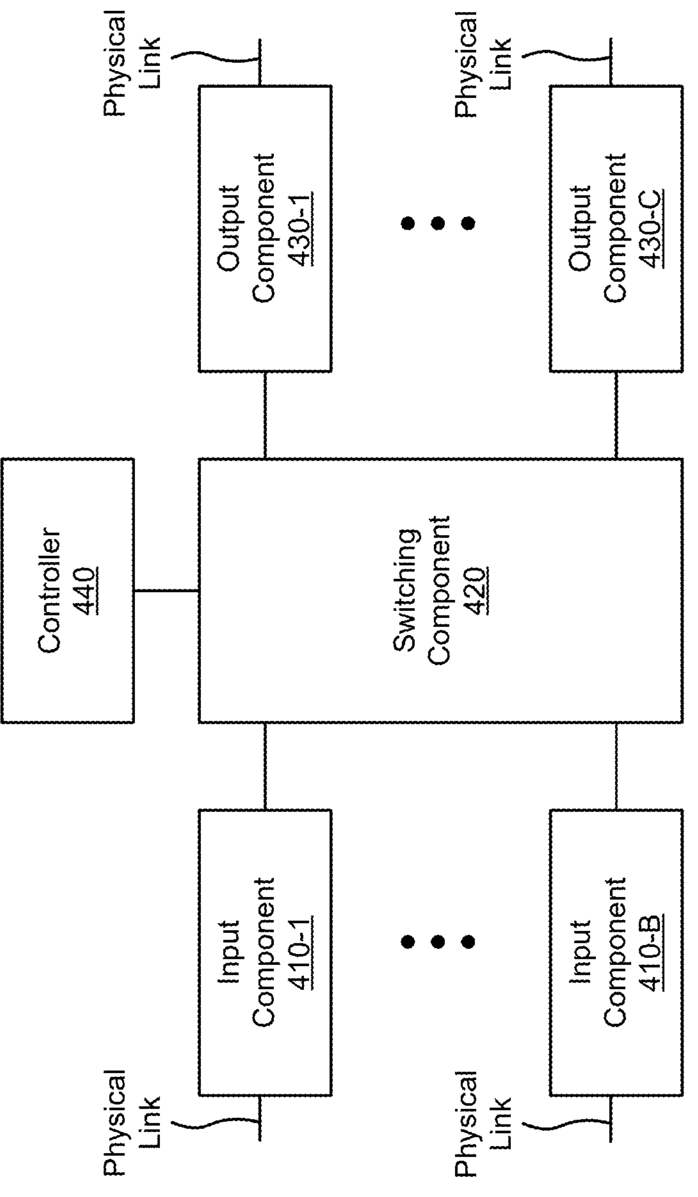

FIG. 4 is a diagram of example components of one or more devices of FIG. 2. The example components may be included in a device 400. The device 400 may correspond to the network device 210. In some implementations, the network device 210 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication component. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
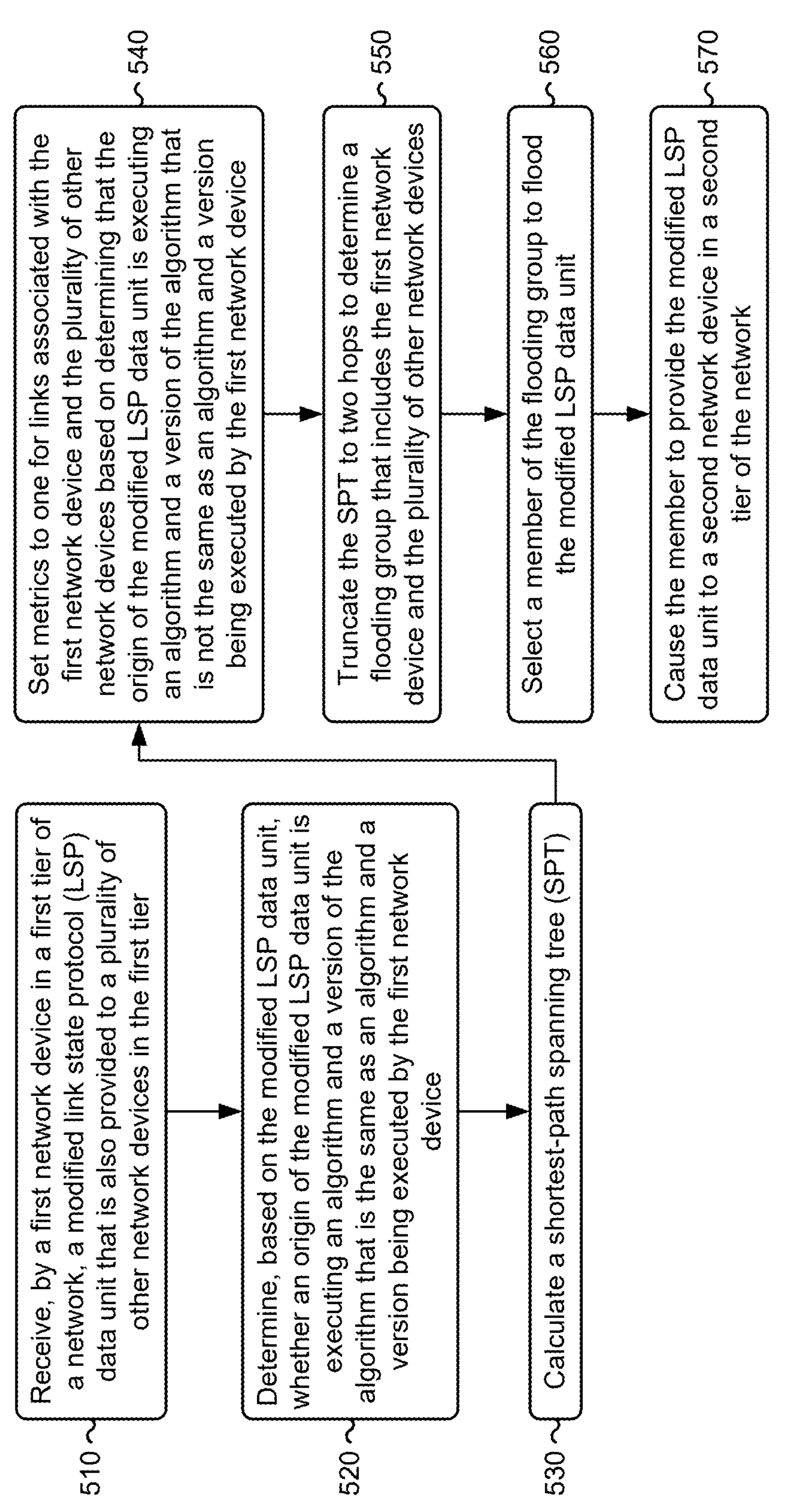
FIG. 5 is a flowchart of an example process for providing seamless support and node-by-node migration for multiple distributed flood reduction algorithms in the same network.

FIG. 5 is a flowchart of an example process 500 for providing seamless support and node-by-node migration for multiple distributed flood reduction algorithms in the same network. In some implementations, one or more process blocks of FIG. 5 may be performed by a network device (e.g., the network device 210). In some implementations, one or more process blocks of FIG. 5 may be performed by another device or a group of devices separate from or including the network device. Additionally, or alternatively, one or more process blocks of FIG. 5 may be performed by one or more components of the device 300, such as the processor 320, the memory 330, the input component 340, the output component 350, and/or the communication component 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving a modified link state protocol (LSP) data unit that is also provided to a plurality of other network devices in the first tier (block 510). For example, the first network device, in a first tier of a network, may receive a modified link state protocol (LSP) data unit that is also provided to a plurality of other network devices in the first tier, as described above.

As further shown in FIG. 5, process 500 may include determining, based on the modified LSP data unit, whether an origin of the modified LSP data unit is executing an algorithm and a version of the algorithm that is the same as an algorithm and a version being executed by the first network device (block 520). For example, the first network device may determine, based on the modified LSP data unit, whether an origin of the modified LSP data unit is executing an algorithm and a version of the algorithm that is the same as an algorithm and a version being executed by the first network device, as described above. In some implementations, the origin of the modified LSP data unit is a leaf network device of the network.

As further shown in FIG. 5, process 500 may include calculating a shortest-path spanning tree (SPT) (block 530). For example, the first network device may calculate a shortest-path spanning tree (SPT), as described above.

As further shown in FIG. 5, process 500 may include setting metrics to one for links associated with the first network device and the plurality of other network devices based on determining that the origin of the modified LSP data unit is executing an algorithm and a version of the algorithm that is not the same as an algorithm and a version being executed by the first network device (block 540). For example, the first network device may set metrics to one for links associated with the first network device and the plurality of other network devices based on determining that the origin of the modified LSP data unit is executing an algorithm and a version of the algorithm that is not the same as an algorithm and a version being executed by the first network device, as described above.

As further shown in FIG. 5, process 500 may include truncating the SPT to two hops to determine a flooding group that includes the first network device and the plurality of other network devices (block 550). For example, the first network device may truncate the SPT to two hops to determine a flooding group that includes the first network device and the plurality of other network devices, as described above. In some implementations, truncating the SPT includes truncating the SPT from a perspective of the origin of the modified LSP data unit and with the metrics set to one.

As further shown in FIG. 5, process 500 may include selecting a member of the flooding group to flood the modified LSP data unit (block 560). For example, the first network device may select a member of the flooding group to flood the modified LSP data unit, as described above. In some implementations, the member of the flooding group is the first network device.

As further shown in FIG. 5, process 500 may include causing the member to provide the modified LSP data unit to a second network device in a second tier of the network (block 570). For example, the first network device may cause the member to provide the modified LSP data unit to a second network device in a second tier of the network, as described above.

In some implementations, process 500 includes causing other members of the flooding group to not provide the modified LSP data unit to the second network device. In some implementations, process 500 includes preventing flooding of the modified LSP data unit to the origin of the modified LSP data unit. In some implementations, process 500 includes creating a two-hop list (THL) of network devices executing an algorithm, creating a remote neighbor list (RNL) of network devices executing the algorithm, and sorting the RNL.

In some implementations, process 500 includes calculating a hash on an identifier of the modified LSP data unit to determine a number, wherein selecting the member of the flooding group comprises identifying a network device of the RNL as the member based on the number and the THL. In some implementations, process 500 includes setting a timer associated with detecting flooding failures, and identifying, upon expiration of the timer, partial sequence number packets (PSNPs) of modified LSP data units that have not been reflooded.

In some implementations, process 500 includes processing the PSNPs per protocol procedures to resynchronize the modified LSP data units that have not been reflooded, and generating a notification indicating resynchronization of the modified LSP data units that have not been reflooded. In some implementations, process 500 includes receiving, from the origin of the modified LSP data unit, a signal identifying an algorithm used to calculate a flooding topology. In some implementations, process 500 includes executing a mobile ad-hoc-network based, load-balancing algorithm. In some implementations, process 500 includes implementing intermediate-system-to-intermediate-system cryptographic authentication.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a first network device in a first tier of a network, a modified link state protocol (LSP) data unit that is also provided to a plurality of other network devices in the first tier;

determining, by the first network device and based on the modified LSP data unit, whether an origin of the modified LSP data unit is executing an algorithm and a version of the algorithm that is the same as an algorithm and a version being executed by the first network device;

calculating, by the first network device, a shortest-path spanning tree (SPT);

setting, by the first network device, metrics to one for links associated with the first network device and the plurality of other network devices based on determining that the origin of the modified LSP data unit is executing an algorithm and a version of the algorithm that is not the same as an algorithm and a version being executed by the first network device;

truncating, by the first network device, the SPT to two hops to determine a flooding group that includes the first network device and the plurality of other network devices;

selecting, by the first network device, a member of the flooding group to flood the modified LSP data unit; and causing, by the first network device, the member to provide the modified LSP data unit to a second network device in a second tier of the network.

2. The method of claim 1, further comprising:

causing other members of the flooding group to not provide the modified LSP data unit to the second network device.

3. The method of claim 1, further comprising:

preventing flooding of the modified LSP data unit to the origin of the modified LSP data unit.

4. The method of claim 1, wherein truncating the SPT comprises:

truncating the SPT from a perspective of the origin of the modified LSP data unit and with the metrics set to one.

5. The method of claim 1, further comprising:

creating a two-hop list (THL) of network devices executing an algorithm;

creating a remote neighbor list (RNL) of network devices executing the algorithm; and sorting the RNL.

6. The method of claim 5, further comprising:

calculating a hash on an identifier of the modified LSP data unit to determine a number, wherein selecting the member of the flooding group comprises:

identifying a network device of the RNL as the member based on the number and the THL.

7. The method of claim 1, wherein the member of the flooding group is the first network device.

8. A first network device, comprising:

one or more memories; and one or more processors to:

receive a modified link state protocol (LSP) data unit that is also provided to a plurality of other network devices in a first tier of a network that includes the first network device;

determine, based on the modified LSP data unit, whether an origin of the modified LSP data unit is executing an algorithm and a version of the algorithm that is the same as an algorithm and a version being executed by the first network device;

calculate a shortest-path spanning tree (SPT);

set metrics to one for links associated with the first network device and the plurality of other network devices based on determining that the origin of the modified LSP data unit is executing an algorithm and a version of the algorithm that is not the same as an algorithm and a version being executed by the first network device;

truncate the SPT to two hops to determine a flooding group that includes the first network device and the plurality of other network devices;

select a member of the flooding group to flood the modified LSP data unit;

cause the member to provide the modified LSP data unit to a second network device in a second tier of the network; and cause other members of the flooding group to not provide the modified LSP data unit to the second network device.

9. The first network device of claim 8, wherein the one or more processors are further to:

set a timer associated with detecting flooding failures; and identify, upon expiration of the timer, partial sequence number packets (PSNPs) of modified LSP data units that have not been reflooded.

10. The first network device of claim 9, wherein the one or more processors are further to:

process the PSNPs per protocol procedures to resynchronize the modified LSP data units that have not been reflooded; and generate a notification indicating resynchronization of the modified LSP data units that have not been reflooded.

11. The first network device of claim 8, wherein the one or more processors are further to:

receive, from the origin of the modified LSP data unit, a signal identifying an algorithm used to calculate a flooding topology.

12. The first network device of claim 8, wherein the one or more processors are further to:

execute a mobile ad-hoc-network based, load-balancing algorithm.

13. The first network device of claim 8, wherein the one or more processors are further to:

implement intermediate-system-to-intermediate-system cryptographic authentication.

14. The first network device of claim 8, wherein the origin of the modified LSP data unit is a leaf network device of the network.

15. A non-transitory computer-readable medium storing a set of instructions, the set of instructions comprising:

one or more instructions that, when executed by one or more processors of a first network device in a first tier of a network, cause the first network device to:

utilize an intermediate-system-to-intermediate-system cryptographic authentication to receive a modified link state protocol (LSP) data unit that is also provided to a plurality of other network devices in the first tier;

determine, based on the modified LSP data unit, whether an origin of the modified LSP data unit is executing an algorithm and a version of the algorithm that is the same as an algorithm and a version being executed by the first network device;

calculate a shortest-path spanning tree (SPT);

set metrics to one for links associated with the first network device and the plurality of other network devices based on determining that the origin of the modified LSP data unit is executing an algorithm and a version of the algorithm that is not the same as an algorithm and a version being executed by the first network device;

truncate the SPT to two hops to determine a flooding group that includes the first network device and the plurality of other network devices;

select a member of the flooding group to flood the modified LSP data unit; and cause the member to provide the modified LSP data unit to a second network device in a second tier of the network.

16. The non-transitory computer-readable medium of claim 15, wherein the one or more instructions further cause the first network device to:

cause other members of the flooding group to not provide the modified LSP data unit to the second network device.

17. The non-transitory computer-readable medium of claim 15, wherein the one or more instructions further cause the first network device to:

prevent flooding of the modified LSP data unit to the origin of the modified LSP data unit.

18. The non-transitory computer-readable medium of claim 15, wherein the one or more instructions further cause the first network device to:

create a two-hop list (THL) of network devices executing an algorithm;

create a remote neighbor list (RNL) of network devices executing the algorithm;

sort the RNL; and calculate a hash on an identifier of the modified LSP data unit to determine a number, wherein the one or more instructions, that cause the first network device to select the member of the flooding group, cause the first network device to:

identify a network device of the RNL as the member based on the number and the THL.

19. The non-transitory computer-readable medium of claim 15, wherein the one or more instructions further cause the first network device to:

set a timer associated with detecting flooding failures; and identify, upon expiration of the timer, partial sequence number packets (PSNPs) of modified LSP data units that have not been reflooded.

20. The non-transitory computer-readable medium of claim 19, wherein the one or more instructions further cause the first network device to:

process the PSNPs per protocol procedures to resynchronize the modified LSP data units that have not been reflooded; and generate a notification indicating resynchronization of the modified LSP data units that have not been reflooded.

* * * * *